(12) United States Patent
Colwell et al.

(10) Patent No.: US 7,946,248 B2
(45) Date of Patent: May 24, 2011

(54) KNOCK-DOWN BIRD FEEDER WITH INTERLOCKING PORT

(75) Inventors: Scott A. Colwell, Dayville, CT (US); John Walsh, Norfolk, MA (US)

(73) Assignee: Droll Yankees, Danielson, CT (US)

( * ) Notice: Subject to any disclaimer, the term of this patent is extended or adjusted under 35 U.S.C. 154(b) by 17 days.

(21) Appl. No.: 12/648,455

(22) Filed: Dec. 29, 2009

(65) Prior Publication Data

US 2010/0192864 A1 Aug. 5, 2010

Related U.S. Application Data

(60) Provisional application No. 61/150,029, filed on Feb. 5, 2009.

(51) Int. Cl.
*A01K 39/01* (2006.01)
(52) U.S. Cl. ...................................................... 119/57.8
(58) Field of Classification Search .............. 119/51.01, 119/52.2, 57.8, 57.9, 72, 531, 537; D30/110, D30/124, 127
See application file for complete search history.

(56) References Cited

U.S. PATENT DOCUMENTS

| | | | | |
|---|---|---|---|---|
| 3,568,641 A | * | 3/1971 | Kilham | 119/57.8 |
| D231,369 S | * | 4/1974 | Kilham | D30/127 |
| 4,829,934 A | * | 5/1989 | Blasbalg | 119/57.8 |
| 4,996,947 A | | 3/1991 | Petrides | |
| 5,215,039 A | * | 6/1993 | Bescherer | 119/57.8 |
| D352,138 S | | 11/1994 | Tucker et al. | |
| D385,067 S | * | 10/1997 | Whittles | D30/124 |
| 7,093,561 B2 | * | 8/2006 | Rich et al. | 119/57.8 |
| 7,111,582 B2 | * | 9/2006 | Rich | 119/57.8 |
| D539,991 S | * | 4/2007 | Petrie et al. | D30/127 |
| 7,549,394 B2 | | 6/2009 | Nock | |
| 7,610,876 B1 | * | 11/2009 | Schulz | 119/57.8 |

(Continued)

FOREIGN PATENT DOCUMENTS

CA 2036886 3/1994

(Continued)

OTHER PUBLICATIONS

Combined Search and Examination Report for related UK Application No. GB 1001180.7, dated Apr. 20, 2010.

*Primary Examiner* — Rob Swiatek
*Assistant Examiner* — Ebony Evans
(74) *Attorney, Agent, or Firm* — Brian M. Dingman; Mirick O'Connell DeMallie & Lougee, LLP (57) ABSTRACT

An elongated, tubular bird feeder comprising one or more pairs of interlocking feeder ports, where the feeder ports are of identical constructions, such that each feeder port mates with an identical feeder port. Each port defines an external perch and an external shield that is curved to fit the contour of the tube, a neck which fits tightly into an opening in the tube, and a reduced diameter portion that defines an end face, from which projects two interlocking features: a horizontally-oriented blade member; and a vertically-oriented generally sector-shaped member. When two ports are pushed together into diametrically-opposed side openings in the tube, with end faces located proximate one another, the two sector members will be located adjacent one another to define an essentially semi-circular upper region, and the two blades will be located next to one another to define an essentially horizontal blade member.

19 Claims, 12 Drawing Sheets

U.S. PATENT DOCUMENTS

| | | |
|---|---|---|
| 7,721,676 B2 * | 5/2010 | Bloedorn ..................... 119/57.8 |
| 2006/0016400 A1 | 1/2006 | Rich et al. |
| 2006/0107900 A1 * | 5/2006 | Bescherer ................... 119/57.8 |
| 2006/0266296 A1 | 11/2006 | Nock |
| 2006/0272585 A1 * | 12/2006 | O'Dell ........................ 119/57.8 |
| 2007/0227454 A1 * | 10/2007 | Fahey .......................... 119/57.8 |
| 2009/0020075 A1 | 1/2009 | Wood et al. |

FOREIGN PATENT DOCUMENTS

| | | |
|---|---|---|
| GB | 2415350 | 12/2005 |

\* cited by examiner

KNOCK-DOWN BIRD FEEDER WITH INTERLOCKING PORT

CROSS-REFERENCE TO RELATED APPLICATIONS

This application claims priority to U.S. Provisional Patent Application Ser. No. 61/150,029, entitled "Knock-Down Bird Feeder with Interlocking Port," filed on Feb. 5, 2009. The entire contents of the priority application are expressly incorporated by reference herein.

FIELD OF THE INVENTION

The invention relates to bird feeders, and specifically, to bird feeders with interlocking feeder ports that may be disassembled for cleaning.

BACKGROUND OF THE INVENTION

Figure 1A:
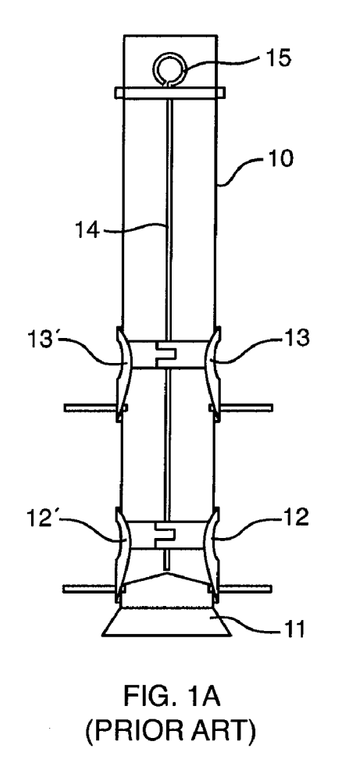
FIGS. 1a, 1b and 1c are schematic views of a prior art bird feeder having interlocking ports.
Figure 1B:
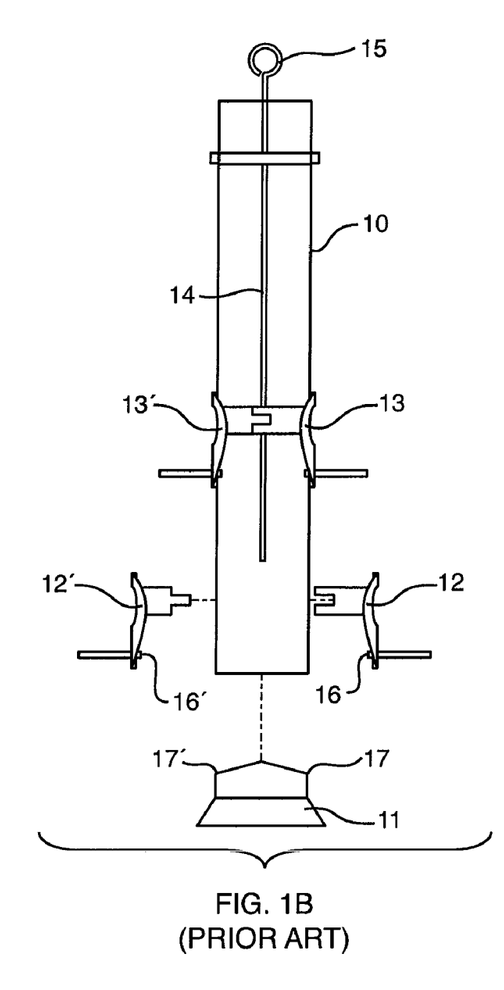
Figure 1C:
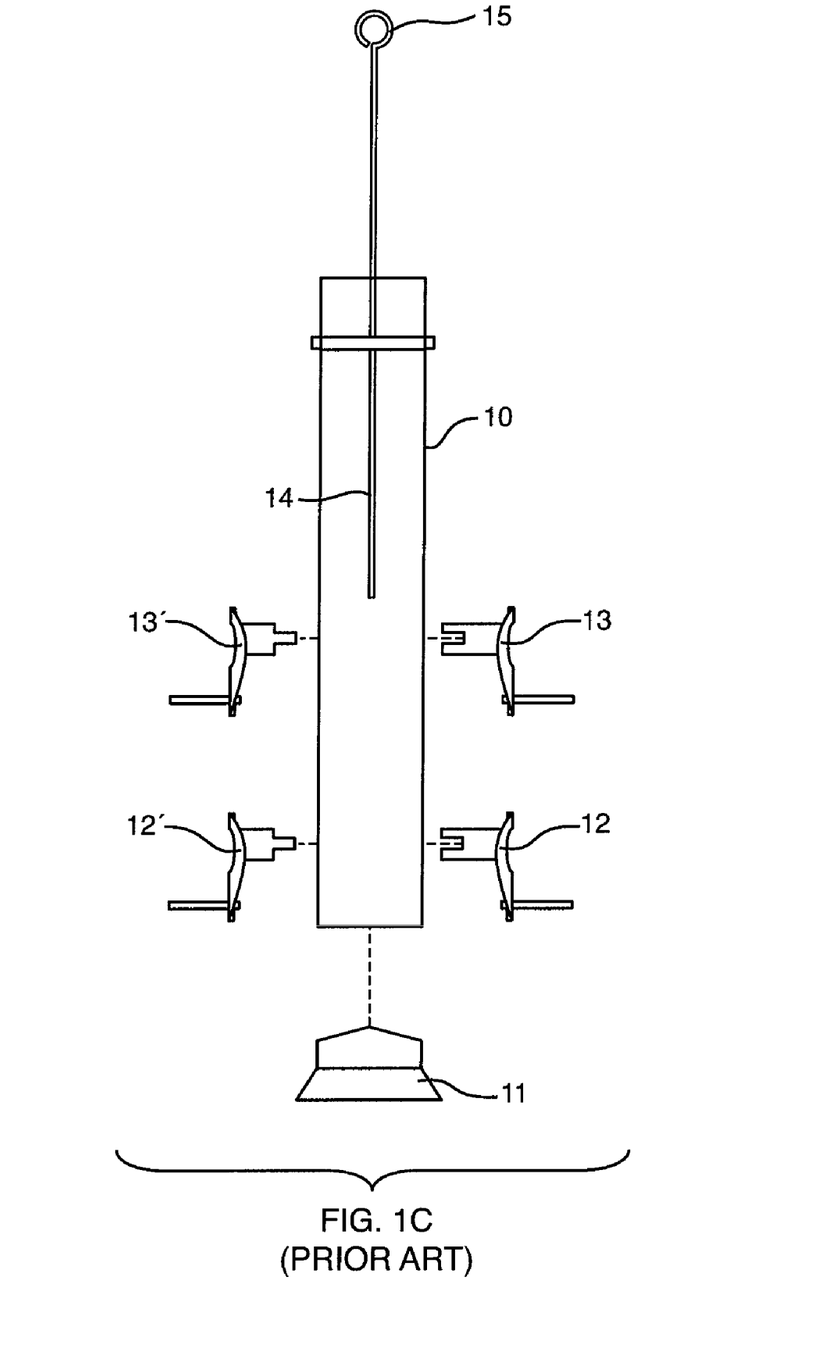

A prior art bird feeder is shown in FIGS. 1a through 1c. These drawings are taken from U.S. Patent Application Publication No. U.S. 2009/0020075, published on Jan. 22, 2009. The bird feeder comprises an elongated tubular receptacle 10, a base 11, a pin 14, and two pairs of interlocking feeder ports, such as pair 13 and 13' and pair 12 and 12'. The interior portion of each port includes an interlocking structure such that the two ports can be held together. The interlocking is accomplished by inter-digitation of the ports, with the distal end of one port, such as port 12 or 13, defining an opening between two fingers, and the mating end of the second port, such as port 12' or 13', defining a single blade or finger that is received in the opening. The mating portions of the ports also define vertically-oriented holes that accept restraining pin 14. Pin 14 thus maintains the ports in the assembled position show in FIG. 1a. When the pin 14 is lifted, ports 12, 12', 13 and 13', and base 11 are free to be removed from tube 10. This construction facilitates cleaning of the tube, as well as the ports and base. Bird feeders that may be disassembled for cleaning, and reassembled for use, are known as "knock-down" bird feeders.

Although this construction may be effective to accomplish a tubular bird feeder that can be relatively easily disassembled for cleaning, the bird feeder may be expensive to manufacture because the two ports of each mating pair are of different constructions from one another. Accordingly, production requires two expensive mold tools, as well as inventory of both types of ports. Also, user reassembly after cleaning is made more difficult by the need to correctly marry the two different ports of each pair.

There is a need in the art, then, for a "knock-down" bird feeder with a feeder port that mates with an identical feeder port, to reduce design and manufacturing costs, and to simplify reassembly after cleaning.

SUMMARY OF THE INVENTION

The invention features an elongated, tubular bird feeder with interlocking feeder ports, where the feeder ports are of identical constructions, such that each feeder port mates with an identical feeder port. The bird feeder of the invention may also be disassembled for cleaning, and reassembled for use.

In a preferred embodiment, the invention provides a feeder, comprising: (a) an elongated receptacle defining at least one pair of diametrically-opposed side openings; (b) a pair of identical ports located in the openings; and (c) a restraining pin located within the interior of the receptacle and interfitting with the ports to hold the ports in place and prevent the ports from being removed from the feeder while the pin is in place within the interior of the receptacle; where each of the ports comprises: (i) a shield that lies against and follows the contour of the external surface of the receptacle; (ii) a generally horizontal perch projecting from the shield; and (iii) a shoulder section that sits inside the receptacle, the shoulder section comprising a neck portion that fits in the opening, and a distal end face defining a pair of projecting members, one member a generally horizontal blade and a second member a generally vertical sector, each such member defining an essentially semi-circular slot to accept the restraining pin; and where, when two such ports are interfitted such that the two sectors are side-by-side and the two blades are side-by-side, and the restraining pin is placed through the ports and engaging each of the semi-circular slots, the ports are held in place in the elongated receptacle and cannot be removed or substantially rotated therein.

In an aspect, the feeder further comprises a base located at the bottom of the elongated receptacle and a diverter located on top of and interfitted with the base. In another aspect, the diverter defines two upper angled surfaces. In still another aspect, the base defines two diametrically opposed outward facing openings, and at least two of the ports further comprise a nub that passes through an opening in the receptacle and into an outward facing opening of the base, such that the ports hold the base and the diverter in the receptacle.

In an aspect, the base and the diverter each comprise one or more vertical through-holes. In another aspect, the base and diverter together form a lower circular lip onto which the receptacle fits. In yet another aspect, the diameter of the distal end face is smaller than the diameter of the neck portion.

In an aspect, when the two ports are interfitted, the two sectors define an essentially semi-circular upper region, and the two blades define an essentially horizontal lower region. In another aspect, the neck portion and the end face together define an open bottom area that leads directly to the external side of the receptacle.

In an aspect, the feeder further comprises a cover removably coupled to the receptacle proximate the top of the receptacle, and a hanging member comprising a generally U-shaped member and a generally cylindrical horizontal member, where the ends of the U-shaped member are removably coupled to either end of the cylindrical member.

In an additional preferred embodiment, the invention provides a feeder comprising: (a) an elongated receptacle defining at least one pair of diametrically-opposed side openings; (b) a pair of identical ports located in the openings; (c) a restraining pin located within the interior of the receptacle and interfitting with the ports to hold the ports in place and prevent the ports from being removed from the feeder while the pin is in place within the interior of the receptacle; (d) a base located at the bottom of the elongated receptacle; and (e) a diverter located on top of and interfitted with the base; where each of the ports comprises: (i) a shield that lies against and follows the contour of the external surface of the receptacle; (ii) a generally horizontal perch projecting from the shield; and (iii) a shoulder section that sits inside the receptacle, the shoulder section comprising a neck portion that fits in the opening, and a distal end face defining a pair of projecting members, one member a generally horizontal blade and a second member a generally vertical sector, each such member defining an essentially semi-circular slot to accept the restraining pin; and where, when two such ports are interfitted such that the two sectors are side-by-side and the two blades are side-by-side, the two sectors define an essentially semi-circular upper region, and the two blades define an essentially horizontal lower region; and where, when the restraining pin is placed through the ports and engaging each of the semi-circular slots, the ports are held in place in the elongated receptacle and cannot be removed or substantially rotated therein.

In an aspect, the diverter defines two upper angled surfaces. In another aspect, the base defines two diametrically opposed outward facing openings, and at least two of the ports further comprises a nub that passes through an opening in the receptacle and into an outward facing opening of the base, such that the ports hold the base and the diverter in the receptacle. In yet another aspect, the base and the diverter each comprise one or more vertical through-holes. In still another aspect, the base and diverter together form a lower circular lip onto which the receptacle fits.

In an aspect, the diameter of the distal end face is smaller than the diameter of the neck portion. In another aspect, the neck portion and the end face together define an open bottom area that leads directly to the external side of the receptacle.

In an aspect, the feeder further comprises a cover removably coupled to the receptacle proximate the top of the receptacle, and a hanging member comprising a generally U-shaped member and a generally cylindrical horizontal member, where the ends of the U-shaped member are removably coupled to either end of the cylindrical member.

In another preferred embodiment, the invention provides a feeder, comprising: (a) an elongated receptacle defining at least one pair of diametrically-opposed side openings; (b) a pair of identical ports located in the openings; (c) a restraining pin located within the interior of the receptacle and interfitting with the ports to hold the ports in place and prevent the ports from being removed from the feeder while the pin is in place within the interior of the receptacle; (d) a base located at the bottom of the elongated receptacle, the base comprising one or more vertical through-holes; and (e) a diverter defining two upper angled surfaces and comprising one or more vertical through holes, the diverter located on top of and interfitted with the base, where the base and the diverter together form a lower circular lip onto which the receptacle fits; where each of the ports comprises: (i) a shield that lies against and follows the contour of the external surface of the receptacle; (ii) a generally horizontal perch projecting from the shield; and (iii) a shoulder section that sits inside the receptacle, the shoulder section comprising a neck portion that fits in the opening, and a distal end face defining a pair of projecting members, one member a generally horizontal blade and a second member a generally vertical sector, each such member defining an essentially semi-circular slot to accept the restraining pin; and where, when two such ports are interfitted such that the two sectors are side-by-side and the two blades are side-by-side, the two sectors define an essentially semi-circular upper region, and the two blades define an essentially horizontal lower region; and where, when the restraining pin is placed through the ports and engaging each of the semi-circular slots, the ports are held in place in the elongated receptacle and cannot be removed or substantially rotated therein.

These and other aspects of the invention will become apparent from the following description. In the description, reference is made to the accompanying drawings, which form a part hereof, and in which there are shown preferred embodiments of the invention. Such embodiments do not necessarily represent the full scope of the invention, and reference is therefore made to the claims for understanding the true scope of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3A is a rear perspective view of a feeder port of the bird feeder of FIG. 2;

DETAILED DESCRIPTION OF THE PREFERRED EMBODIMENTS OF THE INVENTION

Figure 2:
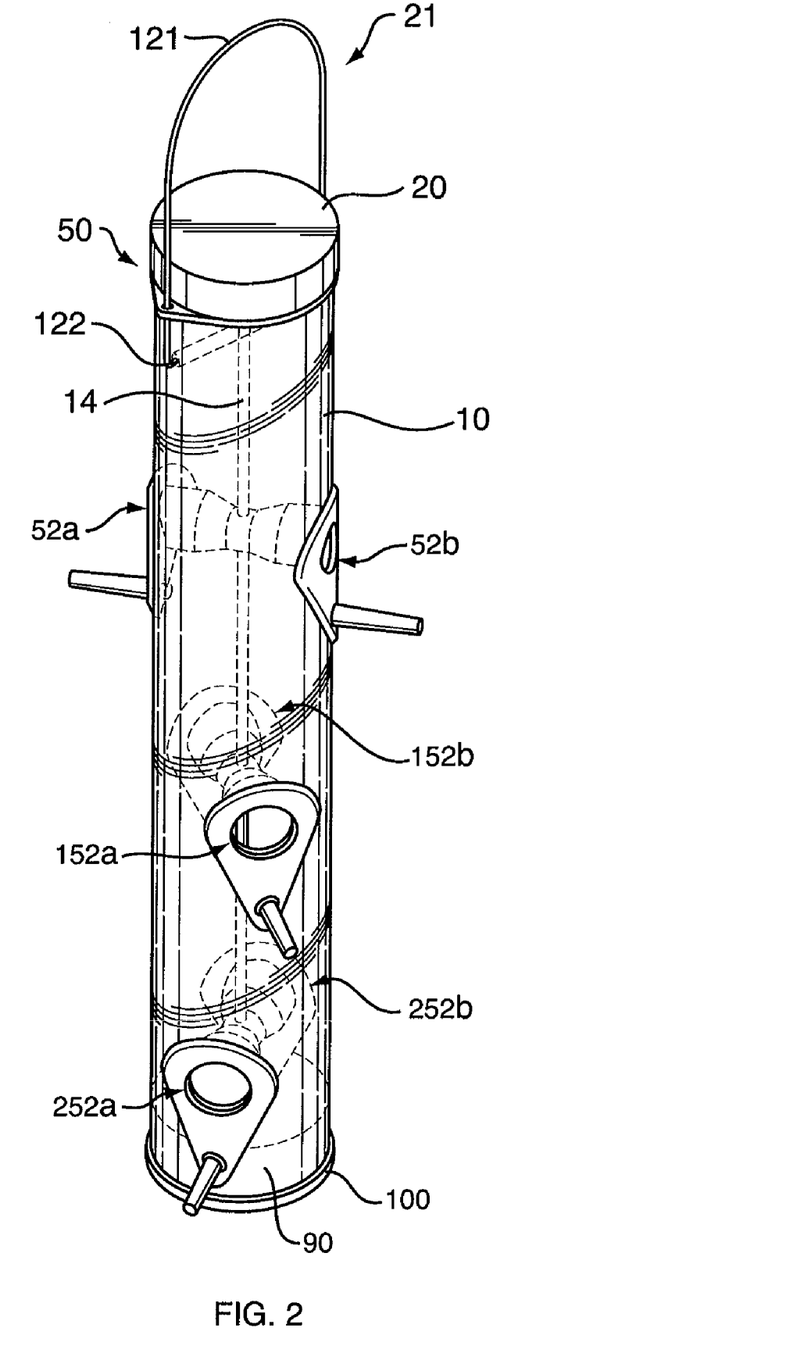
FIG. 2 is a perspective view of a "knock down" bird feeder with interlocking ports, according to a preferred embodiment of the invention.
Figure 4:
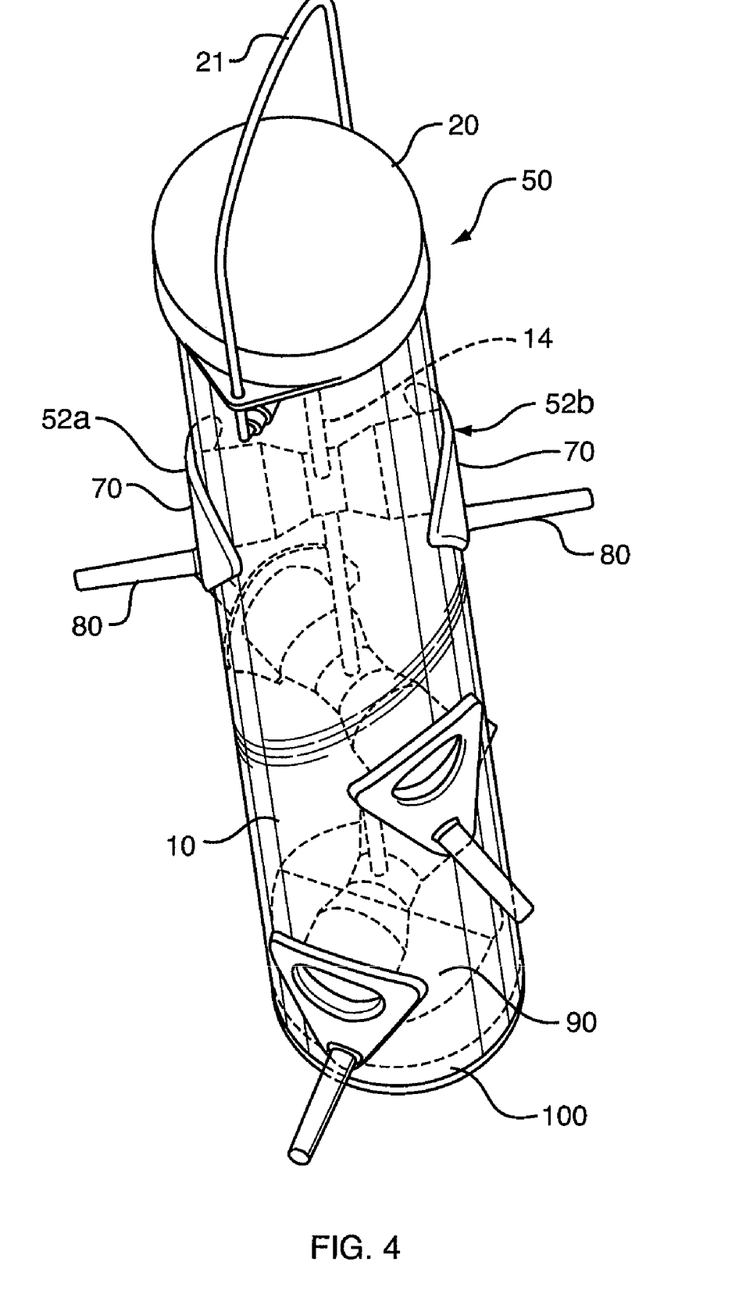
FIGS. 4 and 5 are additional perspective views of the bird feeder of FIG. 2.
Figure 5:
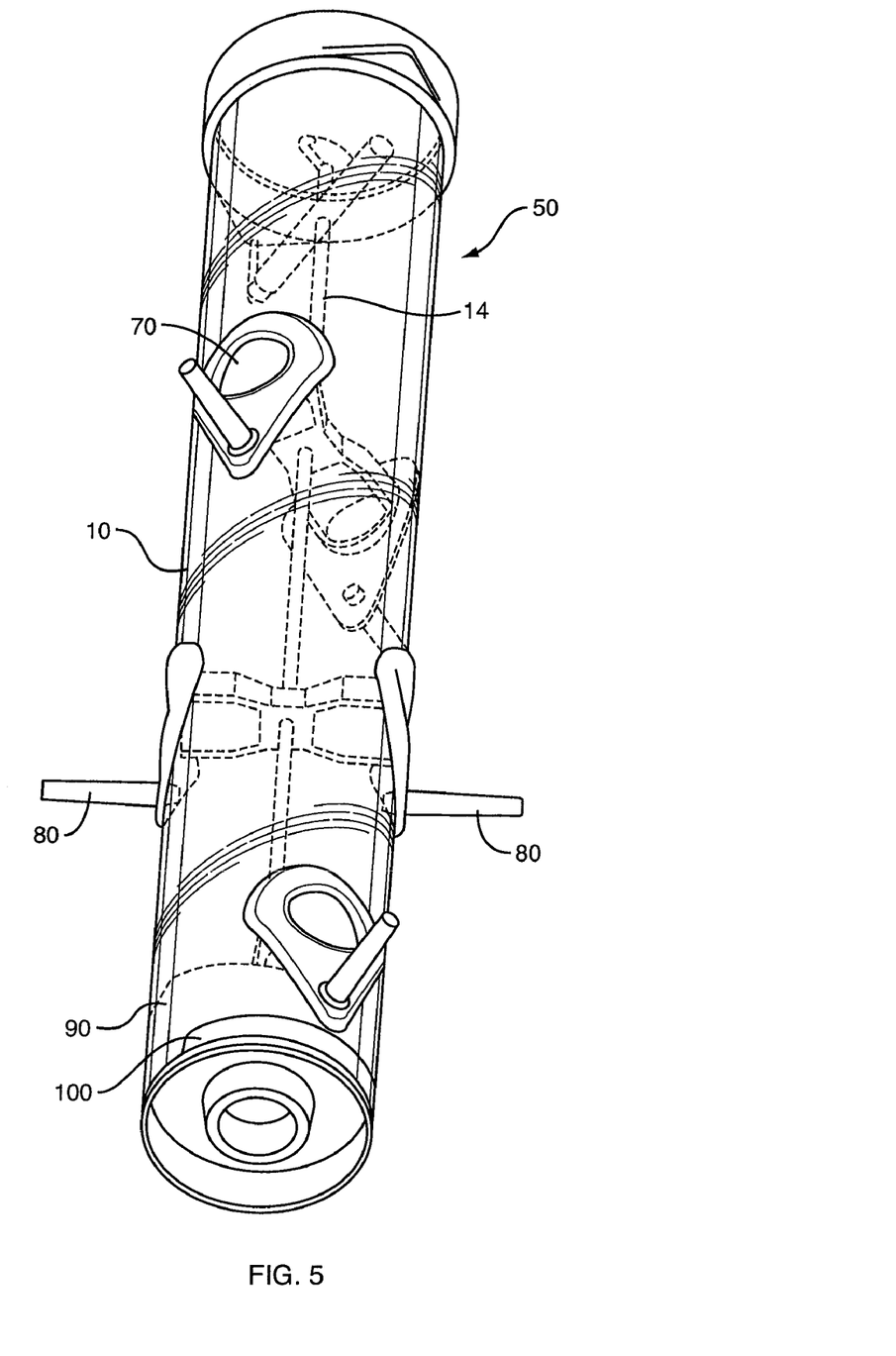
Figure 6:
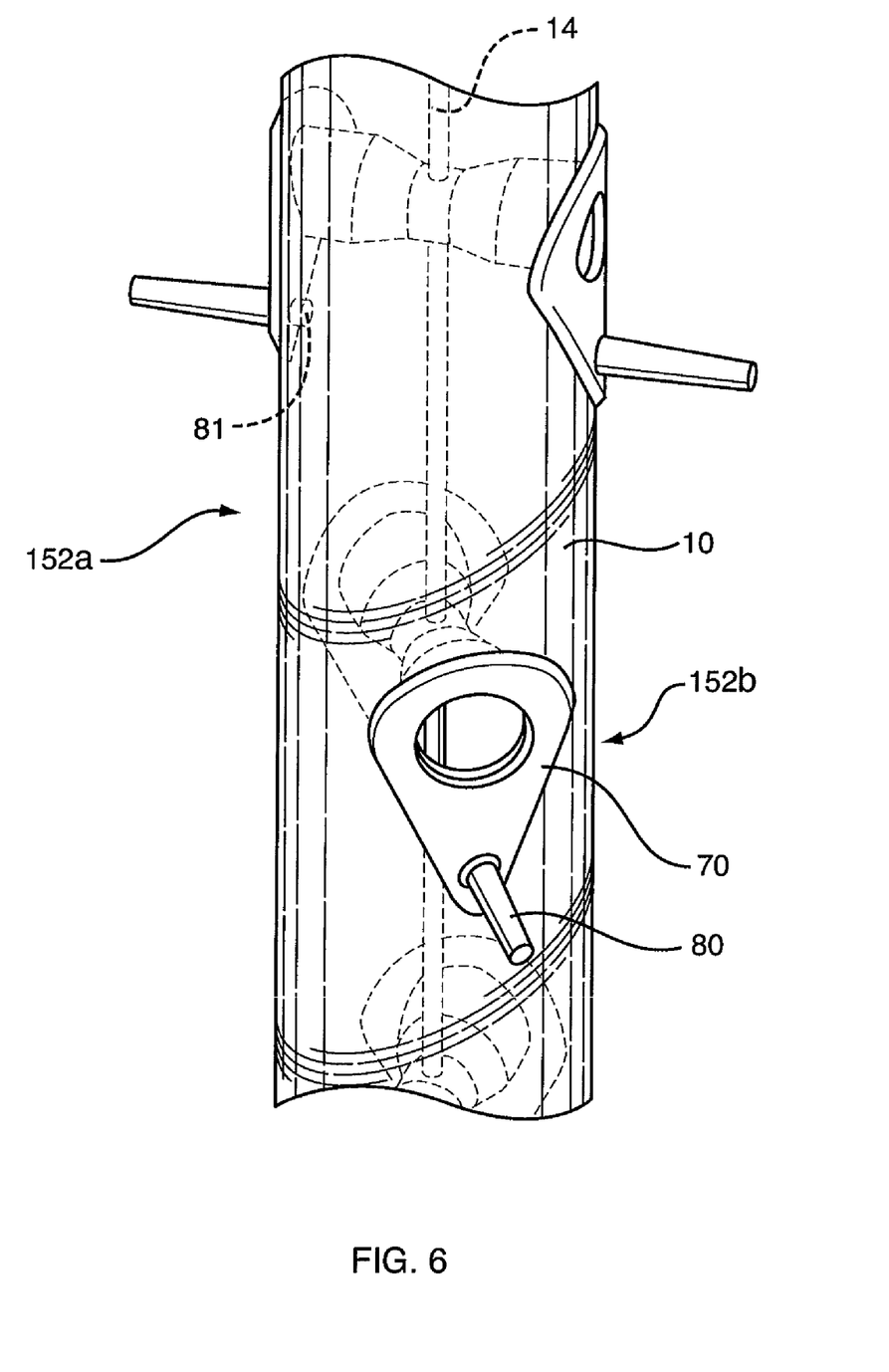
FIG. 6 is a close-up view of two mated, interlocking ports within the bird feeder of FIG. 2.

With reference to FIG. 2, in a preferred embodiment, bird feeder 50 comprises elongated tube 10, hanging member 21, base 100, diverter 90, cover 20, restraining pin 14, and three pairs of feeder ports 52a and 52b, 152a and 152b, and 252a and 252b. Note that all the ports 52a, 52b, 152a, 152b, 252a, and 252b are of identical construction, are designed to accommodate larger foods, such as sunflower seeds and mixed seeds, and are shown in detail in FIGS. 3A-3F. An alternative embodiment of a feeder port, designed to accommodate nyjer seed and other small seeds, is shown in detail in FIGS. 9A-9D. Additional embodiments of assembled bird feeder 50 are also shown in detail in FIGS. 4, 5, and 6. Note that the invention is not limited to three pairs of feeder ports, and encompasses bird feeders with one or more pairs of feeder ports.

As shown in FIG. 2, tube 10 is a generally cylindrical and hollow receptacle for bird food or seed, and is topped by removable cover 20. In a preferred embodiment, tube 10 is made from UV-stabilized polycarbonate, and cover 20 is made from die cast zinc. In alternate embodiments, tube 10 and cover 20 may be injected molded from acrylonitrile butadiene styrene (ABS) or other appropriate plastic. Optional hanging member 21 is coupled to tube 10, and preferably made from stainless steel bail wire.

With further reference to FIG. 2, hanging member 21 comprises a generally U-shaped member 121 and a generally cylindrical, bail rod or horizontal member 122. Cylindrical member 122 is located within tube 10, proximate the top. The two opposing ends of U-shaped member 121 are bent at approximately a 90 degree angle, and removably coupled to either end of cylindrical member 122. The ends of U-shaped member 121 may be spread sufficiently apart to permit their removal from cylindrical member 122.

Port 52a is representative of all of the feeder ports shown in FIG. 2, is designed to accommodate larger foods, such as sunflower seeds and mixed seeds, and is shown in detail in FIGS. 3A-3F.

Port 52a defines external shield 70 that is curved to fit the contour of tube 10, and external perch 80 which extends generally horizontally from the front of port 52a and protrudes through the rear of shield 70 to form internal nubs, shown as reference 81.

Port 52a further defines a shoulder section 300, comprising neck portion 53, which fits tightly into an opening in tube 10, and distal portion 54. In a preferred embodiment, distal portion 54 has a diameter that is smaller than the diameter of neck 53, to reduce the amount of material used in manufacturing. The taper or reduced diameter, however, is not a requirement, and distal portion 54 and neck portion 53 may have the same diameter.

Figure 3B:
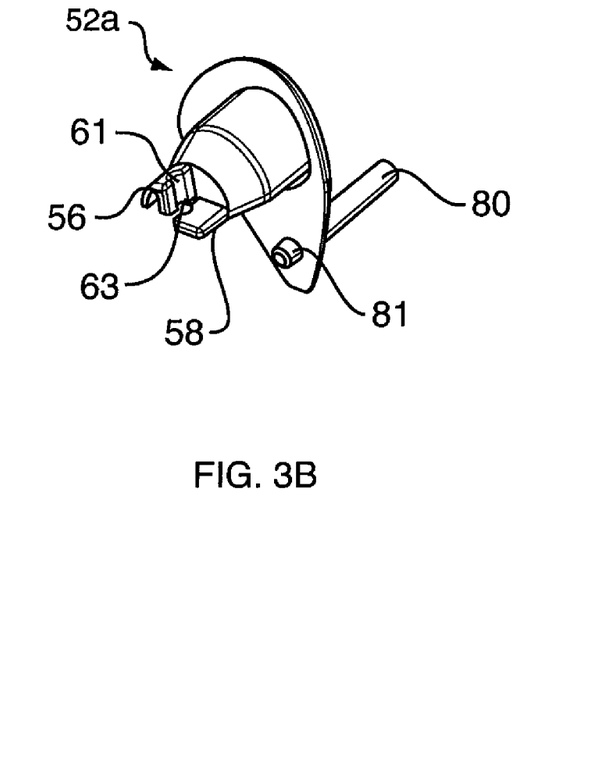
FIG. 3B is a front perspective view of the feeder port of FIG. 3A.
Figure 3C:
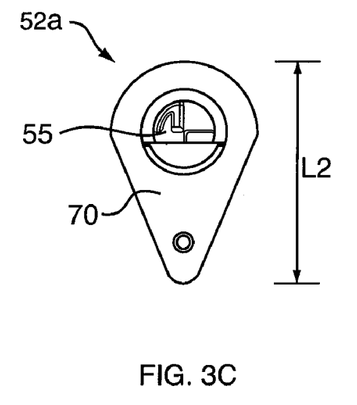
FIG. 3C is a rear view of the feeder port of FIG. 3A.
Figure 3D:
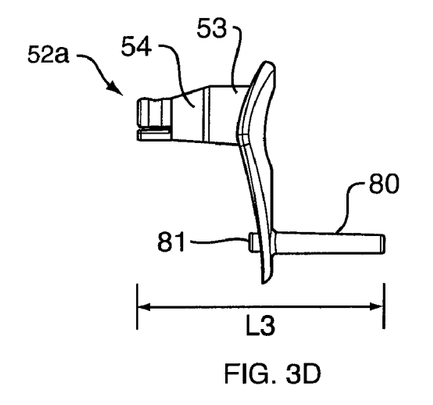
FIG. 3D is a side view of the feeder port of FIG. 3A.
Figure 3E:
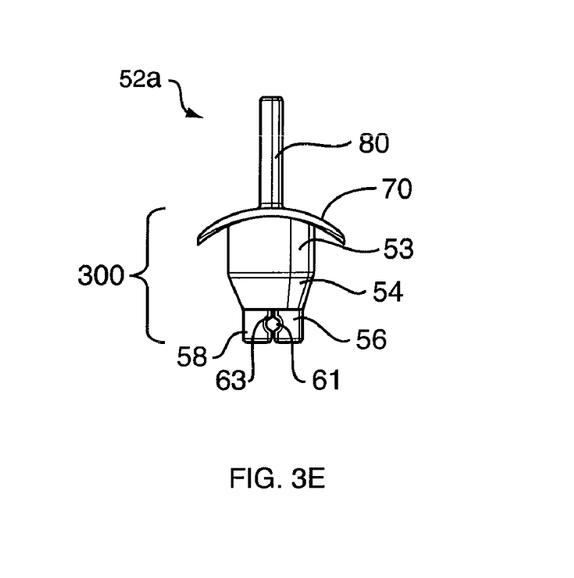
FIG. 3E is a top view of the feeder port of FIG. 3A.
Figure 3F:
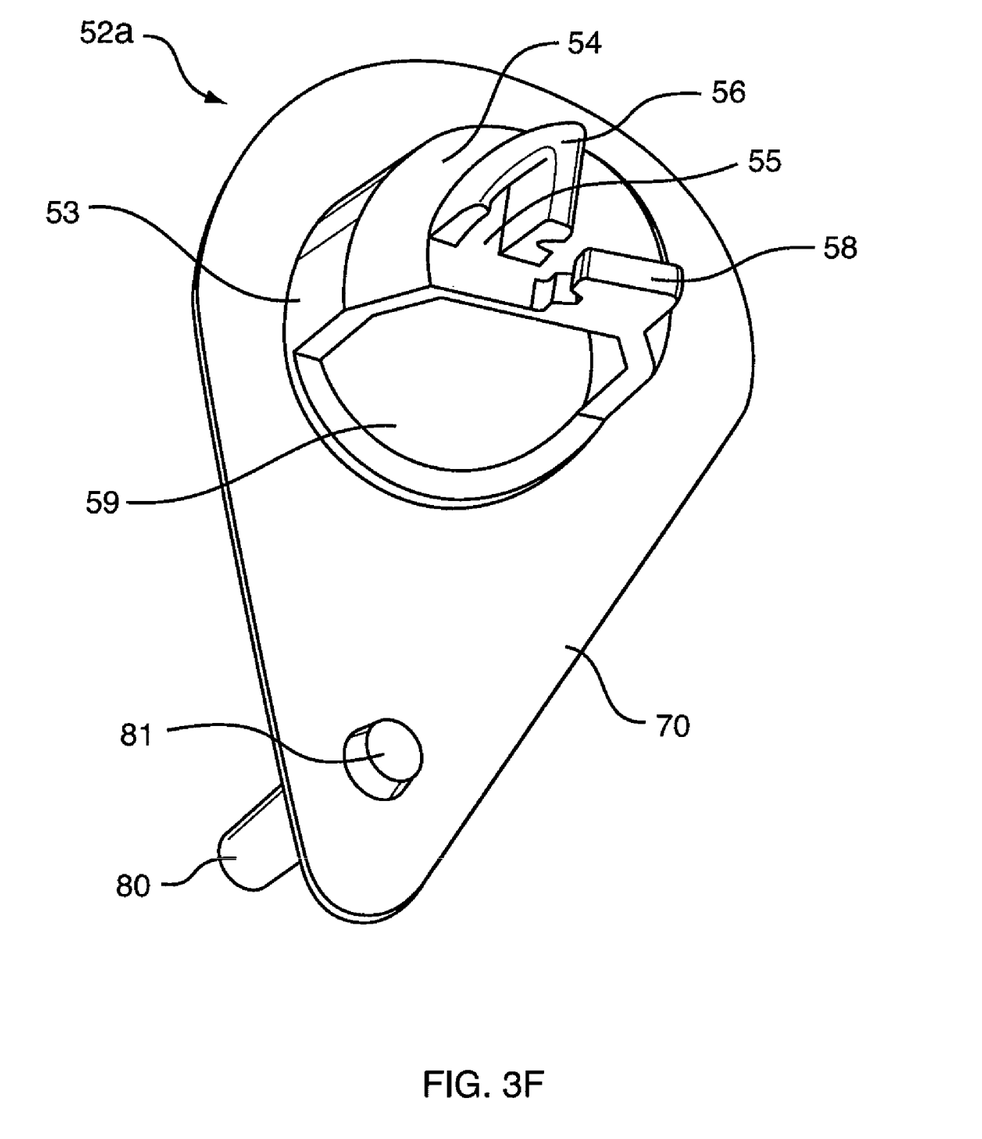
FIG. 3F is a close-up rear perspective view of the feeder port of FIG. 3A.

Distal portion 54 defines end face 55, from which projects two interlocking features: (i) a horizontally-oriented blade member 58; and (ii) a vertically-oriented generally sector-shaped member 56. As shown in FIG. 3F, each blade member 58 extends across approximately one half of the width of the end face 55, proximate the bottom of the end face, and each sector-shaped member 56 extends across approximately one half of the width of the end face 55, proximate the top of the end face.

Each of these two members 58 and 56 defines a semi-circular slot 63 and 61, respectively, that accepts pin 14.

When two of the ports, such as ports 52a and 52b, are pushed together into diametrically-opposed side openings in tube 10, with end faces 55 located proximate one another, the two sector members 56 will be located adjacent one another to define an essentially semi-circular upper region, and the two blades 58 will be located next to one another to define an essentially horizontal blade member. When pin 14 is pushed down through the two mated ports, the pin fits into the semi-circular slots 63 and 61 in the ports to prevent the ports from being pulled out of tube 10. Similarly, the inter-fitting nature of the ports, and of the ports with the pin 14, prevents the ports from rotating about a horizontal axis. Neck 53, distal portion 54, and end face 55 together define an open bottom area 59 that leads directly to the external side of tube 10. This allows a bird perched on perch 80 to reach into the opening and extract bird food or seed.

Figure 9A:
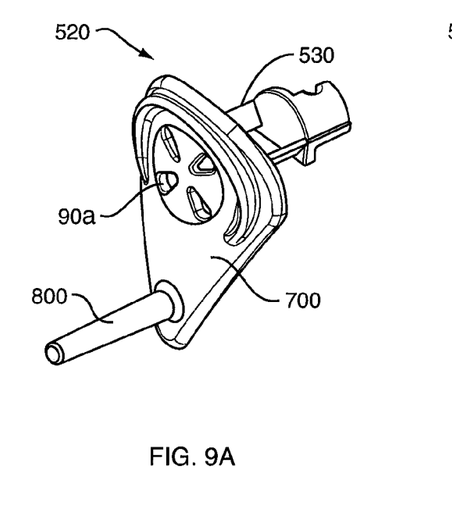
FIG. 9A is front perspective view of an alternate embodiment of a feeder port.
Figure 9B:
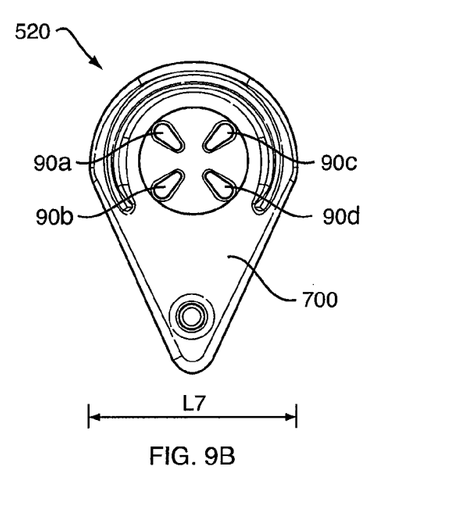
FIG. 9B is a front view of the feeder port of FIG. 9A.
Figure 9C:
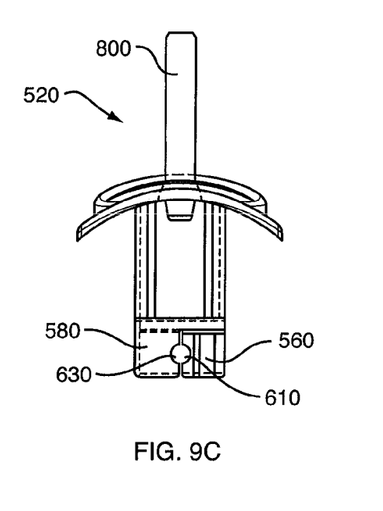
FIG. 9C is a top view of the feeder port of FIG. 9A.
Figure 9D:
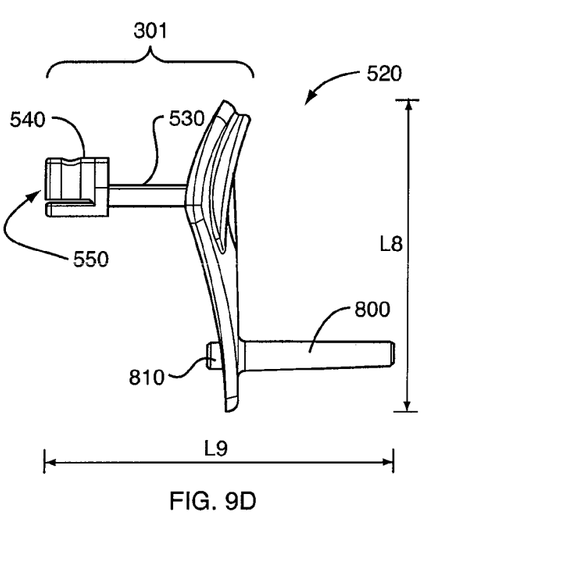
FIG. 9D is a side view of the feeder port of FIG. 9A.

An alternative embodiment of a feeder port 520, designed to accommodate seed mixes that include nyjer and other small seeds, is shown in FIGS. 9A through 9D. Port 520 defines external shield 700 that is curved to fit the contour of tube 10, and external perch 800 which extends generally horizontally from the front of port 520 and protrudes through the rear of shield 700 to form internal nubs, shown as reference 810. As shown in FIG. 9A, port 520 comprises one or more seed openings 90a, 90b, 90c, and 90d. Note that each of the seed openings 90a-90d are smaller than bottom area 59 of feeder port 52a, to accommodate the small seeds such as nyjer.

Port 520 further defines a shoulder section 301, comprising neck portion 530 and distal portion 540. Note that shoulder section 301 of port 520 is not covered, as compared to shoulder section 300 of port 52a, because the smaller seed must rest directly against feeder holes 90a-90d to be accessible to birds. In contrast, shoulder section 300 of port 52a creates a vacuum in front of opening 59.

Distal portion 540 defines end face 550, from which projects two interlocking features: (i) a horizontally-oriented blade member 580; and (ii) a vertically-oriented generally sector-shaped member 560. Blade member 580 and sector-shaped member 560 are identical to, and perform the same functions, as blade member 58 and sector-shaped member 560 of port 52a, described above.

Blade member 580 defines a semi-circular slot 630, and sector-shaped member defines a semi-circular slot 610, which accepts pin 14. As with ports 52a and 52b, when two ports 520 are pushed together into diametrically-opposed side openings in tube 10, with end faces 550 located proximate one another, the two sector members 560 will be located adjacent one another to define an essentially semi-circular upper region, and the two blade members 580 will be located next to one another to define an essentially horizontal blade member. When pin 14 is pushed down through the two mated ports, the pin fits into the semi-circular slots 630 and 610 in the ports to prevent the ports from being pulled out of tube 10. Similarly, the inter-fitting nature of the ports, and of the ports with the pin 14, prevents the ports from rotating about a horizontal axis.

Both feeder port embodiments, port 52a and port 520, are integral structures, and in a preferred embodiment are made of die cast aluminum or zinc. In alternate embodiments, port 52a and port 520 may be injection molded from acrylonitrile butadiene styrene (ABS) or other appropriate plastic. In a preferred embodiment, port 52a is approximately 2.77 inches in total length, shown as reference L3 in FIG. 3D, 2.5 inches in height, shown as reference L2 in FIG. 3C, and approximately 1.65 inches wide, shown as reference L1 in FIG. 3C. Port 520 is similarly approximately 2.77 inches in total length, shown as reference L9 in FIG. 9D, 2.50 inches in height, shown as reference L8 in FIG. 9D, and approximately 1.54 inches wide, shown as reference L7 in FIG. 9B.

As shown in FIGS. 7A through 7D and FIGS. 8A through 8D, and with further reference to FIG. 2, diverter 90 fits over the top of base 100. In a preferred embodiment, diverter 90 has a diameter of approximately 2.48 inches, shown as reference L5 in FIG. 7C, and a height of approximately 1.70, shown as reference L4 in FIG. 7B. Additionally, in a preferred embodiment, base 100 has a radius of curvature of approximately 1.24 inches, shown as reference R1 in FIG. 8B, and a height of approximately 1.08 inches, shown as reference L6 in FIG. 8C.

Figure 7A:
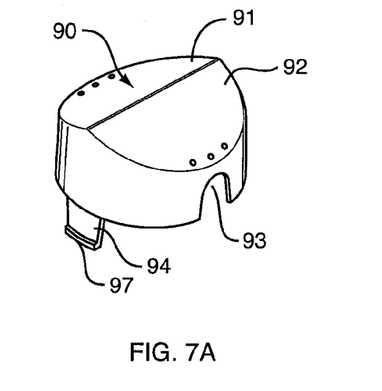
FIG. 7A is a perspective view of a diverter of the bird feeder of FIG. 2.
Figure 7B:
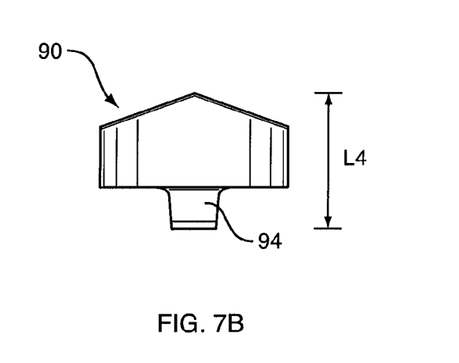
FIGS. 7B and 7C are side views of the diverter of FIG. 7A.
Figure 7C:
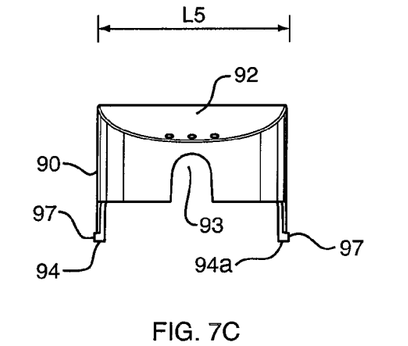
Figure 7D:
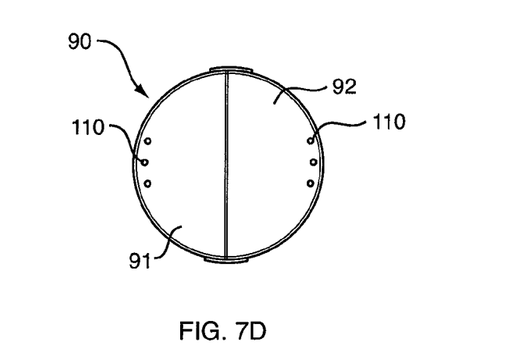
FIG. 7D is a top view of the diverter of FIG. 7A.
Figure 8A:
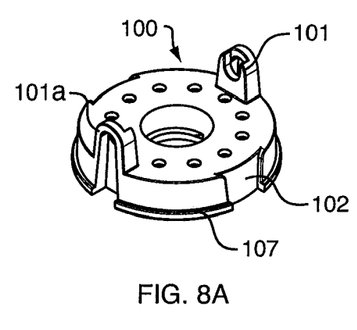
FIG. 8A is a perspective view of a base of the bird feeder of FIG. 2.
Figure 8B:
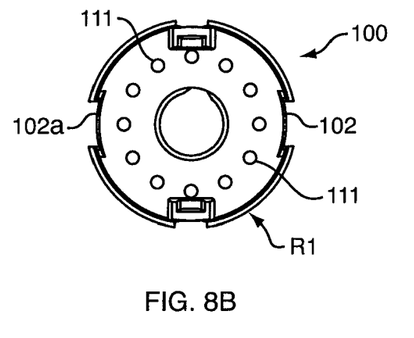
FIG. 8B is a top view of the base of FIG. 8A.
Figure 8C:
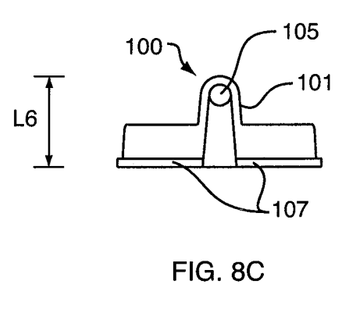
FIGS. 8C and 8D are side views of the base of FIG. 8A.
Figure 8D:
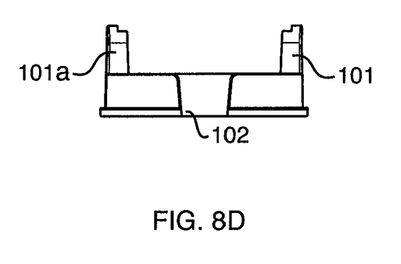

Diverter 90 defines two upper angled surfaces 91 and 92 that channel bird seed at the bottom of the feeder 50 toward the two lower feeder ports. Diverter 90 also defines two diametrically opposed openings 93 that fit over the projecting ears 101 and 101a of base 100. One opening 93 is shown in FIG. 7A. Projections 94 and 94a of diverter 90 fit into diametrically opposed depressions 102 and 102a in base 100.

When assembled, lip portions 97 of diverter 90, and lip portions 107 of base 100, together form a lower circular lip onto which tube 10 fits. Ears 101 and 101a define horizontal holes 105 that accept internal nubs 81 such that the two lower ports, such as ports 252a and 252b of FIG. 2, hold the base 100 in place. This construction allows the diverter and the base to be removed when the two lower ports are removed. Diverter 90 and base 100 include a series of vertical through-holes 110 and 111, respectively, to allow for drainage of water and allow for air movement; these features help to keep the bird seed from caking in humid conditions, such that it flows more freely.

Bird feeder 50 may be disassembled by first removing U-shaped member 121 and cover 20, then pulling pin 14 up and away from base 100. Ports 52*a*, 52*b*, 252*a* and 252*b*, or ports 520 in an alternate embodiment, may then be removed by pulling each away from the center of the tube 10. Base 100 and diverter 90 may be removed by pulling down. Bird feeder 50 may be reassembled by reversing these steps.

Although specific features of the invention are shown in some figures and not others, this is for convenience only, as some features may be combined with any or all of the other features in accordance with the invention.

Recitation ranges of values herein are merely intended to serve as a shorthand method of referring individually to each separate value falling within the range, unless otherwise indicated herein, and each separate value is incorporated into the specification as if it were individually recited herein.

The use of any and all examples, or exemplary language (e.g., "such as") provided herein, is intended merely to better illustrate the invention and does not pose a limitation on the scope of the invention.

A variety of modifications to the embodiments described herein will be apparent to those skilled in the art from the disclosure provided herein. Thus, the invention may be embodied in other specific forms without departing from the spirit or essential attributes thereof.

What is claimed is:

1. A feeder, comprising:
   a) an elongated receptacle defining at least one pair of diametrically-opposed side openings;
   b) a pair of identical ports located in the openings; and
   c) a restraining pin located within the interior of the receptacle and interfitting with the ports to hold the ports in place and prevent the ports from being removed from the feeder while the pin is in place within the interior of the receptacle;
   where each of the ports comprises:
      i) a shield that lies against and follows the contour of the external surface of the receptacle;
      ii) a generally horizontal perch projecting from the shield; and
      iii) a shoulder section that sits inside the receptacle, the shoulder section comprising a neck portion that fits in one of the openings, and a distal end face defining a pair of projecting members, one member a generally horizontal blade and a second member a generally vertical sector, each such member defining an essentially semi-circular slot to accept the restraining pin; and
   where, when two such ports are interfitted such that the two sectors are side-by-side and the two blades are side-by-side, and the restraining pin is placed through the ports and engaging each of the semi-circular slots, the ports are held in place in the elongated receptacle and cannot be removed or substantially rotated therein.

2. The feeder of claim 1 further comprising a base located at the bottom of the elongated receptacle and a diverter located on top of and interfitted with the base.

3. The feeder of claim 2, where the diverter defines two upper angled surfaces.

4. The feeder of claim 2 in which the base defines two diametrically opposed outward facing openings, and each port further comprises a nub that passes through an opening in the receptacle and into an outward facing opening of the base, such that the ports hold the base and the diverter in the receptacle.

5. The feeder of claim 2, in which the base and the diverter each comprise one or more vertical through-holes.

6. The feeder of claim 2, in which the base and diverter together form a lower circular lip onto which the receptacle fits.

7. The feeder of claim 1, where the diameter of the distal end face is smaller than the diameter of the neck portion.

8. The feeder of claim 1, where, when the two ports are interfitted, the two sectors define an essentially semi-circular upper region, and the two blades define an essentially horizontal lower region.

9. The feeder of claim 1, where the neck portion and the end face together define an open bottom area that leads directly to the external side of the receptacle.

10. The feeder of claim 1, further comprising a cover removably coupled to the receptacle proximate the top of the receptacle, and a hanging member comprising a generally U-shaped member and a generally cylindrical horizontal member, where the ends of the U-shaped member are removably coupled to either end of the cylindrical member.

11. A feeder, comprising:
    a) an elongated receptacle defining at least one pair of diametrically-opposed side openings;
    b) a pair of identical ports located in the openings;
    c) a restraining pin located within the interior of the receptacle and interfitting with the ports to hold the ports in place and prevent the ports from being removed from the feeder while the pin is in place within the interior of the receptacle;
    d) a base located at the bottom of the elongated receptacle; and
    e) a diverter located on top of and interfitted with the base;
    where each of the ports comprises:
       i) a shield that lies against and follows the contour of the external surface of the receptacle;
       ii) a generally horizontal perch projecting from the shield; and
       iii) a shoulder section that sits inside the receptacle, the shoulder section comprising a neck portion that fits in one of the openings, and a distal end face defining a pair of projecting members, one member a generally horizontal blade and a second member a generally vertical sector, each such member defining an essentially semi-circular slot to accept the restraining pin; and
    where, when two such ports are interfitted such that the two sectors are side-by-side and the two blades are side-by-side, the two sectors define an essentially semi-circular upper region, and the two blades define an essentially horizontal lower region; and
    where, when the restraining pin is placed through the ports and engaging each of the semi-circular slots, the ports are held in place in the elongated receptacle and cannot be removed or substantially rotated therein.

12. The feeder of claim 11, where the diverter defines two upper angled surfaces.

13. The feeder of claim 11 in which the base defines two diametrically opposed outward facing openings, and each port further comprises a nub that passes through an opening in the receptacle and into an outward facing opening of the base, such that the ports hold the base and the diverter in the receptacle.

14. The feeder of claim 11, in which the base and the diverter each comprise one or more vertical through-holes.

15. The feeder of claim 11, in which the base and diverter together form a lower circular lip onto which the receptacle fits.

16. The feeder of claim 11, where the diameter of the distal end face is smaller than the diameter of the neck portion.

17. The feeder of claim 11, where the neck portion and the end face together define an open bottom area that leads directly to the external side of the receptacle.

18. The feeder of claim 11, further comprising a cover removably coupled to the receptacle proximate the top of the receptacle, and a hanging member comprising a generally U-shaped member and a generally cylindrical horizontal member, where the ends of the U-shaped member are removably coupled to either end of the cylindrical member.

19. A feeder, comprising:
   a) an elongated receptacle defining at least one pair of diametrically-opposed side openings;
   b) a pair of identical ports located in the openings;
   c) a restraining pin located within the interior of the receptacle and interfitting with the ports to hold the ports in place and prevent the ports from being removed from the feeder while the pin is in place within the interior of the receptacle;
   d) a base located at the bottom of the elongated receptacle, the base comprising one or more vertical through-holes; and
   e) a diverter defining two upper angled surfaces and comprising one or more vertical through holes, the diverter located on top of and interfitted with the base, where the base and the diverter together form a lower circular lip onto which the receptacle fits;

where each of the ports comprises:
   i) a shield that lies against and follows the contour of the external surface of the receptacle;
   ii) a generally horizontal perch projecting from the shield; and
   iii) a shoulder section that sits inside the receptacle, the shoulder section comprising a neck portion that fits in one of the openings, and a distal end face defining a pair of projecting members, one member a generally horizontal blade and a second member a generally vertical sector, each such member defining an essentially semi-circular slot to accept the restraining pin; and where, when two such ports are interfitted such that the two sectors are side-by-side and the two blades are side-by-side, the two sectors define an essentially semi-circular upper region, and the two blades define an essentially horizontal lower region; and where, when the restraining pin is placed through the ports and engaging each of the semi-circular slots, the ports are held in place in the elongated receptacle and cannot be removed or substantially rotated therein.

* * * * *